United States Patent [19]
Bailey

[11] 3,984,699
[45] Oct. 5, 1976

[54] SEQUENCE CONTROLLER
[75] Inventor: Ronald L. Bailey, Rockford, Ill.
[73] Assignee: Barber-Colman Company, Rockford, Ill.
[22] Filed: July 14, 1975
[21] Appl. No.: 595,596

[52] U.S. Cl. .................................. 307/41; 307/117
[51] Int. Cl.² ........................................ H02J 3/00
[58] Field of Search ................... 307/11, 38, 39, 40, 307/41, 31, 32, 34, 35, 62, 140, 117; 219/486

[56] References Cited
UNITED STATES PATENTS
3,586,869   6/1971   Kompelien ........................ 307/41

Primary Examiner—James R. Scott
Assistant Examiner—Morris Ginsburg
Attorney, Agent, or Firm—A. Richard Koch

[57] ABSTRACT

A sequence controller, employing digital techniques, employs clock pulses to energize and deenergize incremental loads sequentially at spaced intervals to correct the deviation of a sensed condition from a setpoint. The clock is inhibited from producing pulses when no deviation requiring correction exists. A feedback provides anticipation for the effect of the energization and deenergization of condition changing loads. Hunting is substantially eliminated.

17 Claims, 2 Drawing Figures

SEQUENCE CONTROLLER

BACKGROUND OF THE INVENTION

This invention relates to the selective control of a plurality of loads in response to changes in a sensed condition. More particularly it relates to sequentially energizing and deenergizing loads in response to variations in the sensed condition.

It is well-known that better and more economical results may be frequently obtained in controlling a condition by employing one or more of a plurality of relatively small condition changers operating efficiently under full load in preference to operating a single large condition changer inefficiently at a varying fraction of full load. such small condition changers, as loads, are generally energized and deenergized sequentially, as required, to correct for any deviation of the controlled condition from a predetermined setpoint. Mechanical, thermal, pneumatic and electrical devices of various types of accomplish sequential control are well-known, but have failed to meet all of the problems encountered.

One problem lies in determining, at start-up or upon a step change in the setpoint or sensed condition, how many condition changers to activate in order to correct for any deviation of the sensed condition from the setpoint within a reasonably short time.

A second problem concerns preventing sudden excessively large start-up demands on the power supply for the condition changing loads.

A third problem arises when sequencing is accomplished by a clock controlled switching device, such as a shift register, counter, and the like. Upon receipt of a clock pulse the number of energized outputs is changed. In the past clocks have operated continuously so that even when the desired conditions are present, there is a continual change in the energized outputs, resulting in continual hunting. Hunting results in excessive wear, with reduction in life of equipment, waste of power, and frequently undesirable fluctuation in the controlled condition.

SUMMARY OF THE INVENTION

The sequence controller disclosed herein employs digital techniques to provide rapid response to step changes in the deviation of a sensed condition from a setpoint while remaining substantially unaffected by transient conditions. Hunting is substantially eliminated through use of a novel inhibitor. A feedback provides anticipation, thereby limiting the number of incremental loads energized and deenergized to those required to correct the deviation in an acceptable period of time. The rate at which the incremental loads are activated is spaced so that their start-up power demands do not substantially overlap.

DESCRIPTION OF THE PREFERRED EMBODIMENT

The sequence controller described and shown is a general purpose controller. It may control liquid level as by activating valves to admit or withdraw liquid from tanks. It may control pressure as by activating compressors. It may limit electrical power demand by switching loads on and off. It may control space heating as by activating heating units. It may control space cooling as by activating refrigeration compressors. It could also be used to activate indicating devices to alert an attendant to various levels of possibly unsafe condition deviations. These are representative of uses for the sequential controller. Other uses will be obvious.

Figure 1:
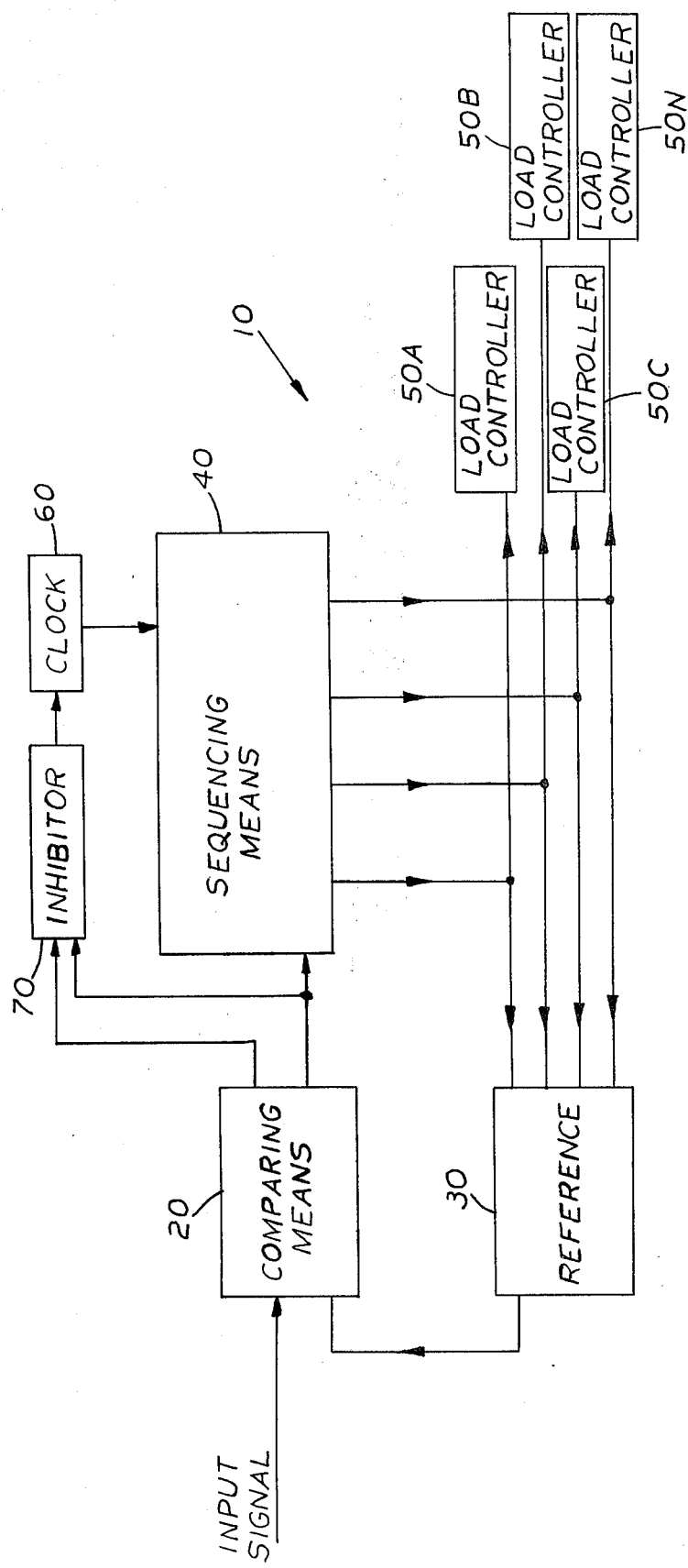
FIG. 1 is a block diagram of the sequence controller.

As best seen in FIG. 1 the sequence controller 10 comprises a comparing means 20 receiving and comparing with a reference 30 a received variable analog input signal, usually a measured deviation of a sensed condition from a predetermined setpoint. The comparing means produces, in accordance with the result of said comparison, a mode response that is delivered to sequencing means 40, which is enabled to energize one more or one less of a plurality of load controllers 50A, B, C, . . . N in accordance with the mode response. Energization of the load controllers results in a corresponding feedback which adjusts the reference 30 in a direction tending to reduce the result of the comparison. The sequencing means 40 operates periodically in synchronism with a clock 60, which is prevented from operating by an inhibitor 70 in absence of a condition response from comparing means 20.

CIRCUIT

Figure 2:
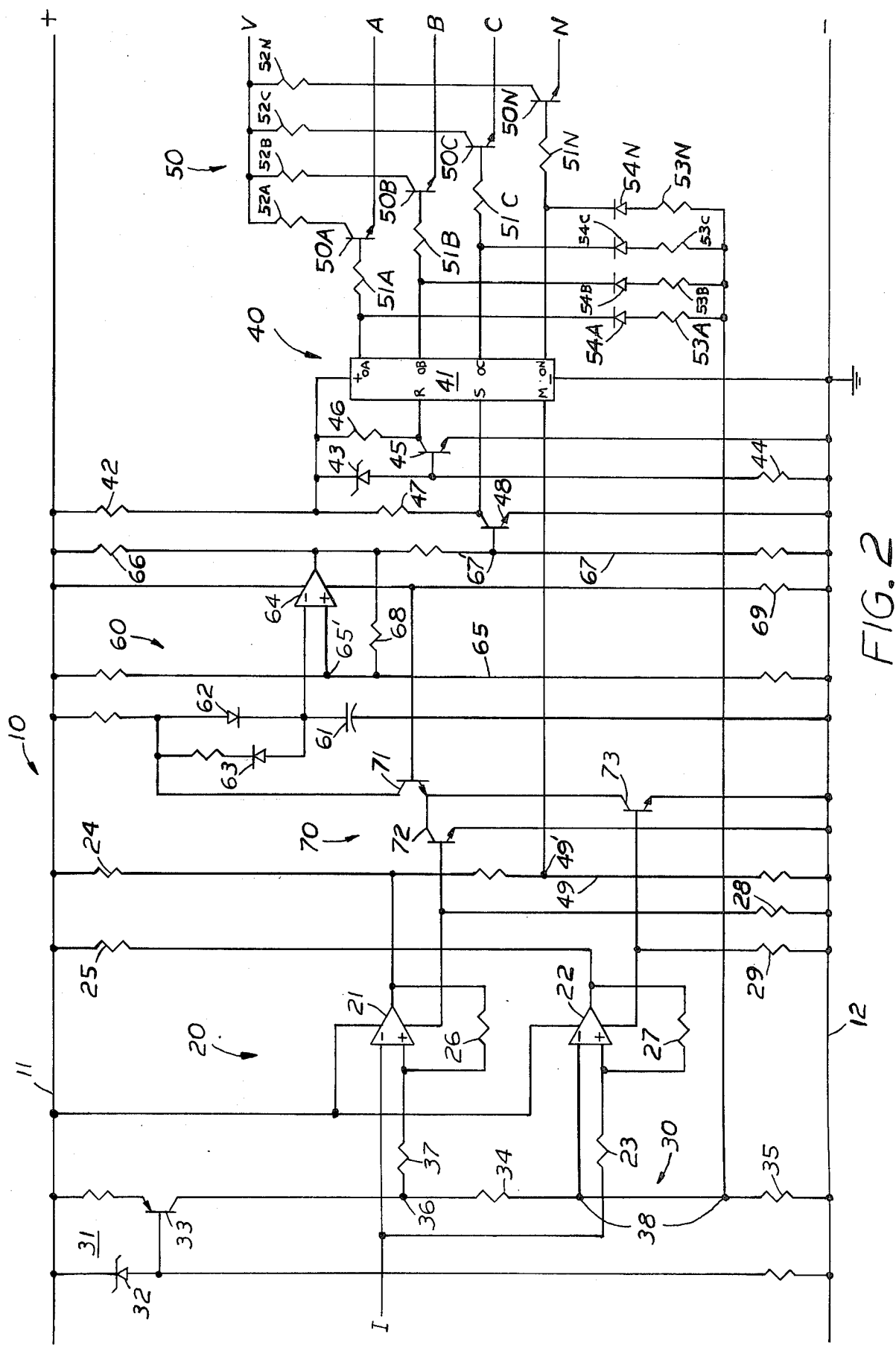
FIG. 2 is a circuit diagram of a preferred embodiment of a sequence controller in accordance with this invention.

A preferred electronic embodiment is shown in FIG. 2, in which lines 11 and 12 are connectable to the positive (+) and negative (−) terminals respectively of a regulated direct current power supply.

The comparing means 20 comprises high and low comparators 21, 22 respectively. The inverting terminal (−) of the high comparator 21 is connected, and the non-inverting terminal (+) of the low comparator 22 is coupled through scaling resistor 23, to an input terminal I. The outputs of the high and low comparators 21, 22 are connected through fixed load resistors 24, 25 respectively to line 11 and through positive feedback resistors 26, 27 to the respective non-inverting terminals. The positive power terminal of each comparator 21, 22 is connected to line 11. The negative power terminals are connected through high and low comparator power resistors 28, 29 respectively to line 12.

Reference 30 comprises a constant current regulator 31, shown as a Zener diode 32 controlling conduction of a PNP transistor 33, in series with deadband and basic reference resistors 34, 35 respectively between lines 11, 12. A high reference node 36 between transistor 33 and deadband resistor 34 is coupled through scaling resistor 37 to the non-inverting terminal of high comparator 21. A low reference node 38 between deadband and basic reference resistors 34, 35 is connected to the inverting terminal of low comparator 22.

the sequencing means 40 comprises a right-left shift register 41, having its positive (+) power terminal coupled to line 11 through voltage dropping resistor 42 and its negative (−) power terminal connected to line 12. A Zener diode 43, with a series connected reset resistor 44, parallels the shift register 41 between the power terminals. A reset NPN transistor 45 has its base-emitter junction connected across reset resistor 44 and its collector connected to the reset terminal R and through reset load resistor 46 to the positive power terminal of the shift register. The shift terminal S is connected through shift load resistor 47 and voltage dropping resistor 42 to line 11, and through the collector-emitter circuit of shift NPN transistor 48 to line 12. The mode terminal M is connected to tap 49' on a voltage divider 49 between the output of high comparator 21 and line 12. The output terminals OA, OB, OC, . . . ON are connected to the control circuits of load controller 50A, B, C, . . . N.

As shown in FIG. 2, the load controllers 50A, B, C, . . . N comprise NPN transistors. The transistors have their bases connected through current limiting resistors 51A, B, C, . . . N to the output terminals OA, OB, OC, . . . ON respectively. The emitters are connected to load terminals A, B, C, . . . N respectively and from there through external loads, such as the firing circuits of semi-conductor switching devices (not shown) to line 12. The collectors are coupled to a power source at terminal V through resistors 52A, B, C, . . . N respectively. The power source may be AC or DC as required. If DC, the terminal V could be connected to line 11. The output terminals OA, OB, OC, . . . ON are also connected through respective feedback resistors 53A, B, C, . . . N and isolating diodes 54A, B, C, . . . N to node 38.

The clock 60 is shown as comprising a capacitor 61 charged through charge diode 62 between lines 11, 12 and discharged through discharge diode 63 to line 12 as permitted by the inhibitor 70 to be described later, the capacitor also being connected between the inverting terminal (−) of a differential amplifier 64 and line 12. The non-inverting terminal (+) is connected to a tap 65'on a reference voltage divider 65 between line 11, 12. The output terminal is connected through a clock load resistor 66 to line 11, through a clock voltage divider 67 to line 12, and through a clock feedback resistor 68 to the non-inverting terminal. A tap 67' on the clock voltage divider is connected to the base of shift transistor 48. The positive power terminal of amplifier 64 is connected to line 11, and the negative power terminal is coupled through a clock power resistor 69 to line 12.

Inhibitor 70 comprises a clock switched device, such as clock NPN transistor 71, between discharge diode 63 and line 12, having a control terminal, such as the base of transistor 71, connected to the negative power terminal of amplifier 64. Paralleled high and low switching devices, such as high and low comparator NPN transistors 72, 73, form an OR gate in series with transistor 71 with their control circuits paralleling high and low comparator power resistors 28, 29, respectively.

OPERATION

When the sequence controller is initially energized, current flows from + line 11 to − line 12 through voltage dropping resistor 42 to energize the shift register 41 between the power terminals (+), (−). Reset Zener diode 43 blocks current through the base-emitter junction of reset transistor 45 until the breakdown voltage of the Zener diode is exceeded, during which a 1 signal is applied to the reset terminal R to reset the outputs of the shift register to 0. When the outputs at terminals OA, OB, OC, . . . ON are 0, the respective feedback resistors 53A, B, C, . . . N are connected through the negative power terminal (−) to line 12 so that they are in parallel with basic reference resistor 35 between node 38 and line 12. Zener diode 32 regulates the voltage from line 11 to the base of transistor 33 to provide a constant current through the transistor, the deadband resistor 34 and the circuit comprising the paralleled basic reference resistor 35 and feedback resistors 53A, B, C, . . . N. This produces a predetermined voltage as a low condition reference at node 38 and another predetermined voltage as a high condition reference at node 36, which is at a fixed additional voltage above node 38, forming a deadband as determined by deadband resistor 34.

An input signal, that is a voltage function of the difference between a sensed value of a controlled condition and a setpoint, and which is indicative of the amount of corrective action required, is received at input terminal I and is delivered to the inverting terminal (−) of high comparator 21. The non-inverting terminal receives the high condition reference, now acting as a mode reference, at node 36 through scaling resistor 37. If the input signal is lower than the mode reference, an output is produced by the high comparator. Due to the positive feedback provided by resistor 26, the comparator is saturated and produces a 1 output. If the input signal is higher than the mode reference, the output is 0. The output is transmitted by voltage divider 49 through tap 49' to the mode terminal M on shift register 41, where receipt of a 1 enables the register to shift left and a 0 enables the register to shift right when a shift pulse is received from clock 60 at the shift terminal S.

In clock 60, capacitor 61 is charged through diode 62 when line 11 is energized. The voltage on the capacitor is delivered to the inverting terminal (−) of differential amplifier 64, so that the received voltage is high when the capacitor is charged and low when the capacitor is discharged. The voltage divider 65 at tap 65' provides to the non-inverting terminal (+) a fixed voltage intermediate the high and low voltages provided to the inverting terminal. When the high voltage is present at the inverting terminal, there is a 0 output from the differential amplifier, so that shift transistor 48 is turned-off and a 1 signal is received by shift terminal S on shift register 41 from line 11 through voltage dropping and shift load resistors 42, 47. If the capacitor 61 is discharged, the resulting low voltage at the inverting terminal (−) of the differential amplifier 64 causes a 1 output to appear across voltage divider 67 to produce at tap 67' a voltage sufficient to turn-on shift transistor 48, thus essentially grounding the shift terminal S on shift register 41, so that a 0 signal is received. Shifting occurs in the shift register when the signal received at shift terminal S rises from 0 to 1, the direction of the shift being determined by the signal present at the mode terminal M. When there is a 0 output from differential amplifier 64, current passes from line 11 to line 12 through load resistor 66, amplifier 64 and clock power resistor 69, producing a voltage across resistor 69 sufficient to turn on transistor 71, if the emitter of the latter is connected to line 12 through either of high or low comparator transistors 72, 73. This causes capacitor 61 to discharge through diode 63, transistor 71 and either of transistors 72, 73 to line 12. The discharge of the capacitor lowers the voltage received by the inverting terminal of amplifier 64 so that a 1 output is produced. When the output is a 1, current through resistor 69 substantially ceases, reducing the voltage across resistor 69 enough to turn-off transistor 71, breaking the discharge circuit and permitting capacitor 61 to charge again. This alternate charging and discharging continues at a fixed frequency (about each 30 seconds in one embodiment) only as long as either of transistors 72, 73 connects the emitter of transistor 71 to line 12.

When high comparator 21 produces a 0 output, as previously explained, current from line 11 passes to line 12 through load resistor 24, comparator 21 and power resistor 28, producing across resistor 28 a voltage as a first condition response sufficient to turn-on switching transistor 72 and so closing the circuit between the emitter of clock transistor 71 and line 12, thereby enabling clock 60 to produce shift pulses. When high comparator 21 produces a 1 output, current through power resistor 28 substantially ceases, causing the voltage across resistor 28 to drop sufficiently to turn-off switching transistor 72. When the input signal received at the non-inverting terminal (+) of low comparator 22 is lower than the low condition reference received at the inverting terminal (+), a 0 output is produced. Current then flows from line 11 to line 12 through load resistor 25, comparator 22 and power resistor 29, producing across resistor 29 sufficient voltage as a second condition response to turn-on low switching transistor 73, and thus closing a circuit from the emitter of clock transister 71 to line 12, enabling clock 60 to produce shift pulses. When the input signal is greater than the low condition reference, the low comparator 22 produces a 1 output. Current then substantially ceases through power resistor 29, resulting in turn-off of switching transistor 73. It will be obvious that neither of the switching transistors can be turned-on while the input signal is within the deadband between the high and low condition references. The clock, therefore, will produce shift pulses only when the input signal exceeds the high condition reference or is exceeded by the low condition reference.

Let us assume that the sequence controller 10 is being used to control the temperature of a space during the heating season. A thermostat provides a deviation voltage as the input signal between input terminal I and line 12. Heaters are energized and deenergized in stages in response to the outputs provided between the load terminals A, B, C, . . . N respectively and line 12.

When the input signal received at terminal I exceeds the high condition and mode reference at node 36, indicating a demand for heating, the high comparator 21 produces a 0 output as a mode response, thus providing 0 input to the mode terminal M at shift register 41 and enabling a shift to the right. At the same time the voltage across high power resistor 28, serving as a high condition response, turns on high comparator transistor 72, enabling clock 60 to produce pulses for delivery to the shift terminal S of shift register 41. As the first produced pulse rises from 0 to 1, the shift register 41 shifts to the right in accordance with the 0 input to mode terminal M and provides a 1 output at terminal OA to turn on load controller 50A and back bias isolating diode 54A, thus removing feedback resistor 53A from its parallel relation to basic reference resistor 35. By turning on load controller 50A a stage of heating is energized through terminal A. The effective removal of feedback resistor 53A from the circuit increases the resistance of the parallel circuit now comprising basic reference resistor 35 and feedback resistors 53B, C, . . . N, thus increasing the high and low condition references provided at nodes 36, 38. This has the effect of reducing or reversing the sense of the difference between the input signal and the high condition reference, thus anticipating the result of having energized the stage of heating associated with load terminal A. If the difference remained of the same sense, but of reduced value, the mode response of high comparator 21 would remain at 0, enabling another shift to the right on the next clock pulse to energize another stage of heating associated with load terminal B and effectively removing feedback resistor 53B from the circuit. This would result in a further increase in the high and low condition references provided at nodes 36, 38. Additional stages of heating will be energized and additional feedback resistors will be effectively removed from the circuit until the sense of the difference between the input signal at terminal I and the high condition reference at node 36 is reversed, at which time the output of high comparator 21 will become a 1. When the high condition reference voltage at node 36 eventually exceeds the input signal at terminal I, no further stages of heating are required to produce the desired temperature in the controlled space within a reasonable time. The 1 output produced as a mode response by high comparator 21 under these conditions provides a 1 input to mode terminal M on shift register 41, thus enabling it to shift to the left. The voltage, serving as a condition response, across high comparator power resistor 28 is reduced sufficiently by the 1 output of the comparator to turn off high comparator transistor 72, thus removing the connection between clock transistor 71 and line 12 and resulting in inhibition of pulse production by clock 60. This prevents further shifting of shift register 41 and maintains the status quo with regard to the heating stages energized and the high and low condition references at nodes 36, 38. During this time the input signal at terminal I has exceeded the low condition reference at node 38, so that the output of low comparator has remained at 1 and the low comparator transistor 73 has been turned off.

As the temperature in the controlled space rises as a result of energization of heating stages, the input signal will be reduced until it is eventually exceeded by the low condition reference at node 38. When this occurs, the output of low comparator 22 will become a 0 and low comparator transistor 73 will be turned on by the resulting low condition response, permitting clock 60 to produce pulses for delivery to shift terminal S on shift register 41. As the first produced pulse rises from 0 to 1, the shift register 41 shifts to the left in accordance with the 1 input at mode terminal M. Let us assume that before the shift occurred the heating stages associated with terminals A, B and C were energized. Then, when the shift occurred, the output from terminal OC of the shift register would fall from 1 to 0, thereby turning off load controller 50C to deenergize the heating stage associated with load terminal C and removing the back bias from diode 54C to effectively restore feedback resistor 53C as a component of the parallel circuit, now comprising basic reference resistor 35 and feedback resistors 53C . . . N. The addition of feedback resistor 53C to the parallel circuit reduces the parallel resistance and so lowers the low condition reference at node 38 to anticipate the effect of the reduction in heat provided. This probably reverses the sense of the difference between the input signal and the low condition reference. If the sense of the difference is reversed, the output of low comparator 22 becomes a 1 and low comparator transistor 73 will be turned off, inhibiting production of additional pulses by the clock 60 and so preserving the status quo with regard to the number of heating stages energized and the high and low condition references. If the difference between the input signal and the low condition reference is merely reduced without a change in sense, additional pulses will be produced, resulting in sequentially reducing the number of heating stages energized until the sense of the difference between the input signal and the low condition reference is reversed.

Heating stages associated with load terminals A, B, C, ... N will be sequentially energized and deenergized in reverse order as the input signal exceeds the high condition reference and falls below the low condition reference, respectively. The spread between the high and low condition references is sufficient so that the energization or deenergization of one heating stage will not result in hunting. The spread is known as the deadband. If the deadband resistor 34 is removed or is of too low a value, hunting will result. The upper limit on the deadband resistor is determined by the acceptable range of space temperature.

The feedback resistors 53A, B, C, ... N are preferably chosen to produce changes in the high and low condition references at nodes 36, 38 in proportion to the condition changing effect of the loads controlled by the respective load controllers 50A, B, C, ... N. Since the feedback resistors in the preferred embodiment are connected in parallel, the resistances of the feedback resistors are not equal, even though the incremental loads associated with terminals A, B, C, ... N are of equal effect in changing conditions.

It will be seen that by spaced sequential energization and deenergization of the incremental loads, described as heating stages, there will be no sudden large changes in load, even when a large step change in sensed condition or set point occurs. The anticipatory effect of the feedback upon the references limits the number of incremental loads energized or deenergized to those required to produce the desired result within a reasonable time. This itself reduces hunting. Hunting is eliminated by inhibiting the production of clock pulses while the input signal is within the deadband between the high and low condition references.

Although the mode response is described as resulting from comparison with the high condition reference, it will be obvious that the low condition reference and the low comparator could be used for the same purpose. Still further it will be obvious that another reference and another comparator could likewise be employed. The means for producing the mode and condition responses could be transposed or combined in part. The load feedback circuit could be readily converted to series configuration. Other equivalent circuits and components will become obvious to those skilled in the art. The scope of the invention is defined by the claims rather than by the preferred embodiment described.

I claim:

1. A sequence controller for digital control of alternative digital output signals employed to control sequential energization and deenergization of a plurality of incremental loads in response to a received variable analog input signal, said sequence controller comprising an input terminal, a plurality of output terminals, a mode reference, comparing means producing a first digital mode response when the input signal received at said input terminal exceeds the mode reference and a second digital mode response when said mode reference exceeds the input signal, a clock producing digital pulses, means for sequentially shifting from a first to a second of said alternative output signals at an additional of said output terminals with each pulse produced by said clock while said first mode response is present, and an inhibitor controlled by said comparing means and coupled to said clock to selectively prevent shifting by the sequencing means.

2. A sequence controller according to claim 1 wherein said sequencing means shifts from the second to said first of the alternative output signals at an additional of said output terminals with each pulse while said second mode response is present.

3. A sequence controller according to claim 2 wherein the shifting sequence provided at said output terminals by the sequencing means when shifting from the first to the second output signal is in reverse order to the sequence provided when shifting from the second to the first output signal.

4. A sequence controller according to claim 1 additionally comprising a high condition reference and a low condition reference coupled to said comparing means, said comparing means producing a first condition response when the input signal exceeds said high condition reference and a second condition response when the low condition reference exceeds said input signal, said inhibitor controlled by absence of both of the condition responses to prevent shifting of said sequencing means.

5. A sequence controller according to claim 4 wherein said high and low condition references are separated by a fixed deadband.

6. A sequence controller according to claim 4 wherein said inhibitor comprises an OR-gate, the condition response of said means for comparing supplying the inputs to said OR-gate.

7. A sequence controller according to claim 4 wherein said inhibitor prevents production of the pulses in absence of both of said condition responses.

8. A sequence controller according to claim 4 wherein said inhibitor prevents receipt of the pulses by said sequencing means in absence of both of said condition responses.

9. A sequence controller according to claim 4 wherein said mode reference and one of the high and low condition references are one and the same.

10. A sequence controller according to claim 4 additionally comprising a plurality of incremental feedback means controlled by said sequencing means for modifying the references.

11. A sequence controller according to claim 10 wherein said incremental feedback means are added and subtracted in response to the output signals provided to respective ones of said output terminals.

12. A sequence controller according to claim 11 wherein said feedback means controlled modification of the references is a function of the number of energized feedback means.

13. A sequence controller according to claim 11 wherein each of said feedback means modifies the references as a function of the condition changing effect of the load connected to that output terminal receiving the respective output signal.

14. A sequence controller according to claim 11 wherein said mode and condition references are increased and decreased equally by said feedback means.

15. A method for sequentially controlling energization and deenergization of incremental loads comprising the steps of comparing an analog input signal with a mode reference, providing a first mode response when said input signal exceeds the mode reference and a second mode response when said mode reference exceeds the input signal, employing one of said responses to enable sequential energization of the incremental loads and the other of said responses to enable sequential deenergization of the incremental loads, supplying power at spaced intervals to effect enabled energization and deenergization of said incremental loads, and selectively interrupting delivery of the power to effect enabled energization and deenergization of said loads while the input signal exceeds a low condition reference and is exceeded by a high condition reference.

16. A method according to claim 15 additionally comprising incrementally modifying the references as a function of the number of the loads receiving power.

17. A method according to claim 15 further comprising incrementally modifying the references as a function of the condition changing effect of the loads receiving power.

* * * * *